United States Patent [19]

Woracek et al.

[11] Patent Number: 4,779,207
[45] Date of Patent: Oct. 18, 1988

[54] SO₃ FLUE GAS CONDITIONING SYSTEM

[75] Inventors: David L. Woracek, Federal Way; Robert A. Wright, Poway, both of Wash.

[73] Assignee: The Chemithon Corporation, Seattle, Wash.

[21] Appl. No.: 582

[22] Filed: Jan. 6, 1987

[51] Int. Cl.⁴ .......................... G06F 15/46; B03C 3/66
[52] U.S. Cl. ......................................... 364/500; 55/5; 55/105; 364/550; 159/4.02
[58] Field of Search .................. 55/5, 10, 11, 73, 105, 55/112, 122; 423/215.5; 364/496, 500, 502, 550; 159/4.02

[56] References Cited

U.S. PATENT DOCUMENTS

| | | | |
|---|---|---|---|
| 3,686,825 | 8/1972 | Busby | 55/5 |
| 4,042,348 | 8/1977 | Bennett et al. | 55/5 |
| 4,390,831 | 6/1983 | Byrd et al. | 55/105 |
| 4,533,364 | 8/1985 | Altman et al. | 55/5 |
| 4,613,346 | 9/1986 | Reyes et al. | 55/105 |
| 4,624,685 | 11/1986 | Lueckenotte et al. | 364/500 |
| 4,659,342 | 4/1987 | Lind | 55/105 |

Primary Examiner—Parshotam S. Lall
Assistant Examiner—Kevin J. Teska
Attorney, Agent, or Firm—Seed and Berry

[57] ABSTRACT

An air pollution control system for injecting a conditioning agent into the flue gas of a power generator. The conditioning agent changes the resistivity of particulate matter in the flue gas, rendering the particulate matter more easily able to accept an electrostatic charge. Control of the conditioning gas injection rate is monitored by periodically sampling the average input power supplied to the power supplies of the electrostatic flue gas conditioning system. A proportional-integral controller receives the signal representing the difference between the average input power and a predetermined threshold signal. The control signal produced by the proportional integral controller causes incremental changes in the rate at which the conditioning agent, such as SO₃, is added to the flue gas.

18 Claims, 3 Drawing Sheets

SO₃ FLUE GAS CONDITIONING SYSTEM

DESCRIPTION

1. Technical Field

The present invention relates to a system for conditioning flue gas with $SO_3$ in order to improve the efficiency of an electrostatic precipitator, and more particularly, to such a system which is controlled by monitoring the input power to the electrostatic precipitator.

2. Background Art

The flue gas of power generation plants has long been recognized as a source of atmospheric pollution. The particulate matter carried in the flue gas can be removed by electrostatic precipitators that cause the individual particles to accept an electrical charge and then use that charge to attract them to collector plates for disposal. The efficiency of such electrostatic precipitators is dependent upon the ability of the individual particles to take a charge, that is, the resistivity of the particles. It has been found that the presence of $SO_3$ in the flue gas effectively reduces the resistivity of the particles, making them easier to charge electrostatically.

In the combustion of coal, some of the naturally present sulfur is converted to $SO_3$. On the other hand, the effectiveness of $SO_3$ in reducing the resistivity of the particulate matter in the flue gas depends upon the concentration of the $SO_3$, with about 15 to 20 parts per million (ppm) giving optimal results. Therefore, precipitator efficiency is affected by the ability to adjust the amount of $SO_3$ gas injected into the flue gas, regardless of the sulfur content of the coal being burned, to provide an overall $SO_3$ concentration in the optimal range.

If the $SO_3$ concentration is too low, the precipitator will operate at less than optimal efficiency. On the other hand, if the $SO_3$ concentration is too high, the flue gas becomes highly acidic, creating a "blue plume" and contributing to acid rain. In addition, acidic flue gases contribute to corrosion of the pipes carrying the flue gas.

The rate of change of $SO_3$ concentration in flue gas is inherently slow. Therefore, flue gases that have less than optimal $SO_3$ concentrations constitute an emissions problem that can take tens of minutes to correct. Power systems that are operating out of compliance with emissions regulations can be forced to reduce their power output until the emissions are brought back into compliance. Accordingly, it is important to find a way to keep the emissions concentrations within the optimal range.

In the prior art, it is known to sample the sulfur content of coal being conveyed to the power generator so that the rate of injection of $SO_3$ gas into the flue gas can be manually adjusted. This approach can obviously perform significantly differently from optimal due to the time delay problems mentioned earlier. In addition, a person must be assigned to take and test the coal samples.

In another method, opacity instrumentation at the exit of the flue gas stack can determine whether the gas flue gases contain $SO_3$ concentrations above the optimal range. The time delays experienced in correcting this condition when detected, can be undesirably long, necessitating that the power output of the power generator be reduced until the emission regulations are complied with again.

It is desirable, therefore, to have an $SO_3$ flue gas system that is capable of injecting $SO_3$ into a flue gas to maintain the $SO_3$ concentration at an optimal level, with a speed of response that reduces or eliminates the length of time that the flue gases are not at the optimal $SO_3$ concentration.

DISCLOSURE OF THE INVENTION

It is, therefore, an object of the present invention to provide an $SO_3$ generation system that has a substantially reduced time response.

It is another object of the present invention to provide an $SO_3$ injection system that can adapt to variations in the sulfur content of the coal being burned.

It is yet another object of the present invention to provide an $SO_3$ injection system that can operate automatically.

A further object of the present invention is to provide a system that monitors the input power to the electrostatic precipitator.

Still another object of the present invention is to provide an $SO_3$ gas injection system that can periodically determine the input power provided to the electrostatic precipitator and adjust the $SO_3$ gas injected into the flue gas to cause the precipitator to operate at its greatest efficiency.

In one embodiment, the system for preconditioning flue gas to be treated in an electrostatic precipitator comprises a source of a conditioning agent and means for adding the conditioning agent to the flue gas. In addition, the system comprises means for detecting the input power level to the electrostatic precipitator and control means for monitoring the input power level and controlling the amount of conditioning agent added to the flue gas in order to substantially maintain the input power at a predetermined level. For purposes of the present invention, one suitable conditioning agent is $SO_3$. In essence, any substance that effectively reduces the resistivity of the ash particles, thereby making them easier to charge electrostatically, may be used within the methods described herein.

In another embodiment, an air pollution control system providing for the removal of fly ash from flue gas by electrostatic precipitation is disclosed. The control system comprises an electrostatic precipitator positioned to receive a flow of the flue gas, a source of conditioning agent to be added to the flue gas, and means for injecting the conditioning agent into the flue gas before the flue gas enters the electrostatic precipitator. In addition, the air pollution control system comprises means for detecting an input power level to the electrostatic precipitator and control means for monitoring this input power level and adjusting the amount of conditioning agent injected into the flue gas to maintain the input power level substantially at a predetermined level. The control means can periodically sample the precipitator input power to create a control signal which is proportional to the rate of change of conditioning agent added to the flue gas.

BEST MODE FOR CARRYING OUT THE INVENTION

Figure 1:
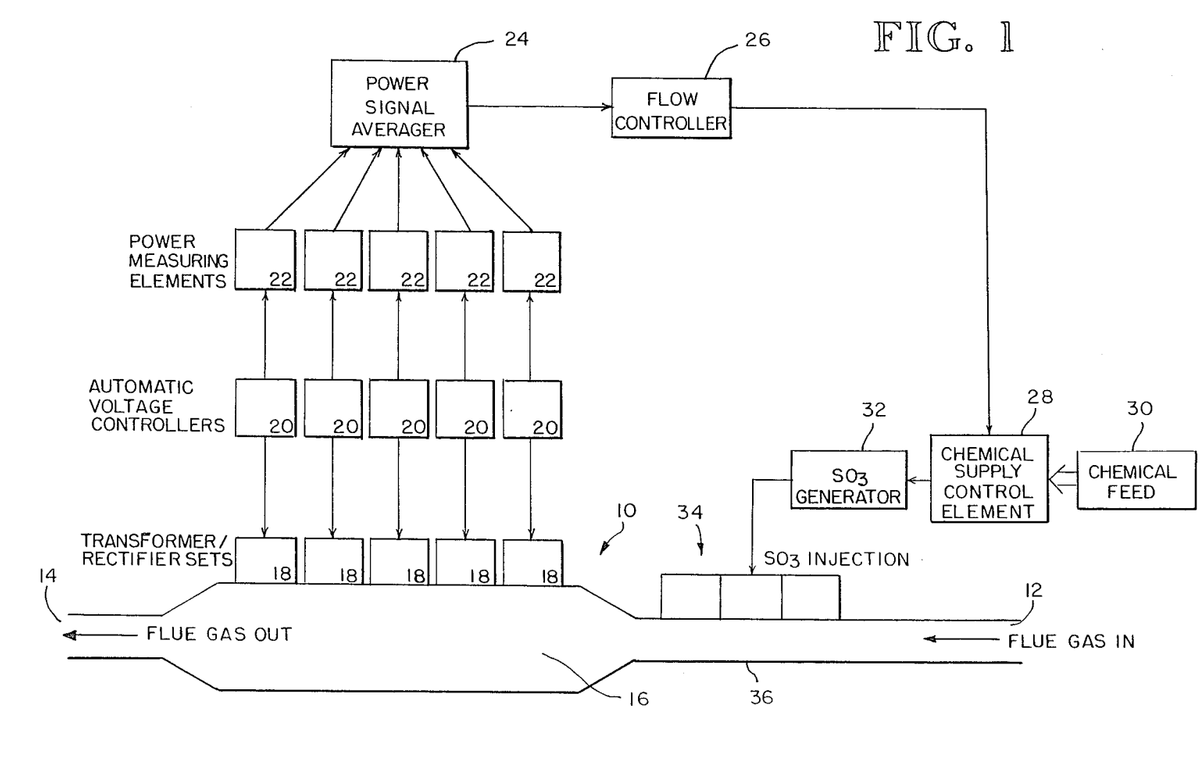
FIG. 1 is a schematic diagram of an electrostatic precipitator operating in conjunction with a system for preconditioning the flue gas using a source of liquid $SO_2$ to be converted to $SO_3$.

Referring to FIG. 1, electrostatic precipitator 10 receives flue gas at entrance 12 and discharges the flue gas at exit 14. Within chamber 16, the precipitator contains a plurality of conventional electrostatic plates that can be held at a direct current (DC) voltage potential with respect to the case of the precipitator. An apparatus for providing an electrostatic charge to particulate matter in the flue gas is also provided within the precipitator chamber.

The electrostatic plates within the chamber are held at the appropriate DC voltage potential by means of transformer/rectifier (T/R) sets 18. The T/R sets can each be connected to a unique subset of the electrostatic precipitator plates, the transformer in the T/R sets causing supplied AC voltage to be substantially increased and the rectifier producing a DC voltage from the transformed AC voltage. T/R sets having appropriate specifications are produced by Environecs of the Buell Company.

The T/R sets 18 are individually supplied with AC voltages by automatic voltage controllers (AVCs) 20. Suitable AVCs are produced by Neundorfer Company, and are microprocessor controlled to maintain the appropriate DC voltage on the electrostatic precipitator plates as the plates attract and collect charged particulate matter. Therefore, the input power supplied to each of the individual T/R sets is determined by the AVCs.

A signal indicative of the input power to each individual T/R set is produced by the AVCs to power measuring elements 22. The power measuring elements can, for example, be model KW-101 power converters made by Applied System Technology, Inc., of Bloomingdale, Illinois. Each of the power measuring elements produces a current signal which is proportional to the input power provided to its respective T/R set. These current signals are received by power signal averager 24, which may, for example, be a model KW-103 averager, also made by Applied System Technology, Inc., of Bloomingdale, Illinois. The power signal averager produces a signal that is proportional to the average power level input to each of the individual T/R sets, as long as the individual input powers are indicated by a current that exceeds a predetermined threshold. By this means, the power signal averager produces a current that is proportional to the input power provided to operative T/R sets. Any T/R sets that are not accepting power are not included in the average power signal. The power signal averager can, therefore, include a microprocessor which is programmed to respond only to current input signals that exceed a predetermined threshold.

The signal produced by the power signal averager is transmitted to flow controller 26, which can be a microprocessor-based controller, such as a Moore Mycro 352E. In a manner to be subsequently described in greater detail, the flow controller responds to the signal produced by the power signal averager by producing an incremental change signal that is supplied to chemical supply control element 28. The chemical supply control element receives a supply of a chemical conditioning agent, such as $SO_3$. One source of $SO_3$ is liquid $SO_2$, as provided by a chemical feed 30 to supply control element 28. Alternatively, the $SO_2$ supplied to the chemical supply control element can be obtained by burning sulfur in air or in excess oxygen. In the case that the chemical feed supplies liquid $SO_2$ to the chemical supply control element, the control element passes a controlled amount of liquid $SO_2$ to $SO_3$ generator 32, which delivers gaseous $SO_3$ to $SO_3$ injectors 34. The $SO_3$ generator can, for example, take the form of a catalytic bed. The injectors are located in the flue gas piping 36, upstream of electrostatic precipitator 10. If the chemical feed supplies liquid $SO_2$ to the chemical supply control element, the control element can be a variable-speed AC induction motor, such as a Toshiba VT130G1. The incremental signal produced by the flow controller causes incremental changes in the speed of the chemical supply control motor, causing a change in the rate at which gaseous $SO_3$ is added to the flue gases in the flue gas piping 36. Typically, the $SO_3$ injector can inject $SO_3$ gas at rates between 6 and 25 parts per million (ppm). The control element is, therefore, capable of causing gaseous $SO_3$ to be injected at rates that include the injector rates that lead to optimal performance by electrostatic precipitator 10.

Figure 2:
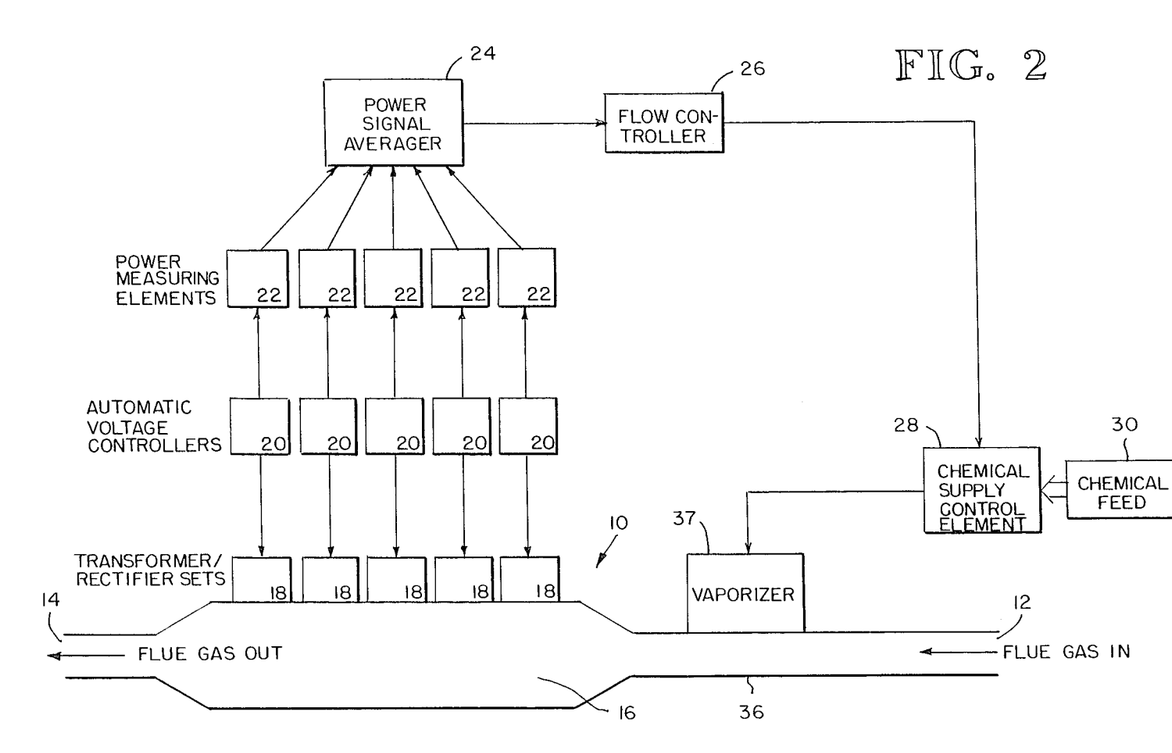
FIG. 2 is a schematic diagram of an electrostatic precipitator operating in conjunction with a system for preconditioning the flue gas utilizing a source of liquid $SO_3$.

There are other ways to add $SO_3$ to the flue gases. For example, liquid $SO_3$ can be supplied by a liquid metering device, under control of a signal from the flow controller, from the chemical feed into a vaporizer system 37 which communicates with the flue piping. This is shown in FIG. 2.

Figure 3:
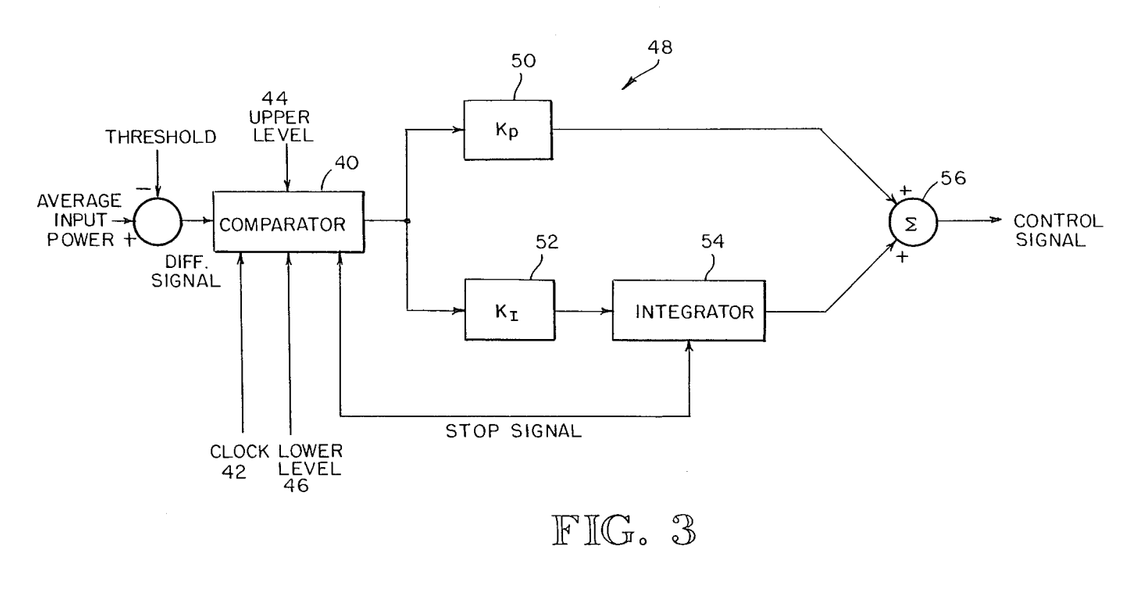
FIG. 3 is a schematic representation of a proportional-integral controller used with the preconditioning flue gas system of the present invention.

Turning to FIG. 3, which is a schematic representation of a proportional-integral control scheme used in one embodiment of the invention, a means for providing the incremental control signal to chemical supply control element 28 (see FIG. 1) can be seen. While this schematic representation will be useful in understanding the operation of the controller, it will be understood by those skilled in the art that the functions shown in the control system of FIG. 3 can be performed by an appropriately programmed microprocessor contained within flow controller 26 (see FIG. 1).

In this control system, the difference between the average input power produced by power signal averager 24 and a predetermined threshold is computed to produce a difference signal that is supplied to a clocked comparator 40. The comparator receives a periodic clock signal 42 and upper and lower level signals 44 and 46, respectively. When the comparator receives a pulse from clock signal 42, it compares the difference signal to the upper and lower levels, respectively. If the sampled difference signal lies between the lower and upper level signals, the comparator awaits the next pulse from clock signal 42. If the difference signal lies outside the interval between the lower and upper signals, an internal start signal is produced, initiating the timing of a predetermined interval of time, for example, ten minutes. After the lapse of the predetermined period of time, the comparator again compares the difference signal to the lower and upper level signals and determines whether the difference signal lies outside the interval the upper and lower level signals define. If so, a stop signal is created and the comparator passes the difference signal to its output until the comparator receives the next pulse on clock signal 42.

The difference signal passed through comparator 40 is next received by proportional-integral controller 48, which subjects the passed-through difference signal to weighting operations 50 and 52, the proportional and integral weights being designated as $K_P$ and $K_I$, respectively. The output from integral weighting operation 52 is passed to integrator 54, which integrates the weighted signal until a stop signal is produced by comparator 40. The weighted outputs of the proportional weighting operation and the integrator are then added together in summer 56 to produce the control signal that is sent to chemical supply control element 28.

Each time comparator 40 determines that the difference signal lies outside the interval defined by lower and upper level signals, it initiates the start signal. Accordingly, as long as the difference signal falls outside the interval defined by the lower and upper signals, the difference signal is passed through the comparator to the weighting operations and a non-zero control signal is produced by the summer.

If, for example, the difference signal exceeds the upper level, the average input power to the electrostatic precipitator must be too high, indicating that an excess $SO_3$ concentration is reducing the fly ash resistivity below the range that leads to optimal performance by the electrostatic precipitator. The control signal, which is negative because weighting constants $K_P$ and $K_I$ are negative, causes the chemical supply control element 28 to reduce the rate at which it feeds the conditioning agent into the flue gas. This causes the resistivity to increase and eventually reduces the input power to an acceptable level.

If, on the other hand, the difference signal lies below the value of the lower level signal, proportional-integral controller 48 produces a positive control signal, increasing the rate at which $SO_3$ is injected into the flue gas.

While various modifications of the embodiment whose detailed description is given above will be apparent to one skilled in the art, such modifications lie within the present invention, whose scope is determined only by the following claims.

We claim:

1. A system for preconditioning flue gas to be treated in an electrostatic precipitator, comprising:
   a source of a conditioning agent;
   means for controllably adding the conditioning agent to the flue gas;
   means for detecting an input power level to the electrostatic precipitator; and
   control means for monitoring the input power level and controlling the amount of conditioning agent added to the flue gas in order to substantially maintain the input power at a predetermined level.

2. The system for preconditioning flue gas of claim 1 wherein said control means comprises:
   means for producing a difference signal proportional to the difference between the monitored input power level and the predetermined power level; and
   means, responsive to the difference signal, for controlling the amount of conditioning agent added to the flue gas.

3. The system for preconditioning flue gas of claim 1 wherein said control means comprises:
   means for producing a difference signal proportional to the difference between the monitored input power level and the predetermined power level;
   clock means, responsive to a start signal, for measuring the passage of a predetermined interval of time and producing a stop signal after the passage of the interval of time;
   means, responsive to the stop signal, for integrating the difference signal as a function of time and for generating a control signal to adjust the amount of conditioning agent added to the flue gas, the control signal being a weighted sum of the difference signal and the integrated difference signal.

4. The system for preconditioning flue gas of claim 3 wherein the control means controls the amount of conditioning agent added to the flue gas to have a time rate of change that is proportional to the control signal.

5. The system for preconditioning flue gas of claim 1 wherein the conditioning agent is $SO_3$.

6. The system for preconditionig flue gas of claim 1 wherein said control means comprises:
   means for producing a difference signal proportional to the difference between the monitored input power level and the predetermined power level;
   clock means, responsive to a start signal, for measuring the passage of a predetermined interval of time and producing a timing signal after the passage of the predetermined interval of time;
   means for comparing the difference signal to predetermined upper and lower levels in response to the timing signal produced by the clock means and for producing a stop signal when the difference signal is above the upper level or below the lower level; and
   means, responsive to the stop signal, for integrating the difference signal as a function of time and for generating a control signal to adjust the amount of conditioning agent added to the flue gas, the control signal being a weighted sum of the difference signal and the integrated difference signal.

7. The preconditioning flue gas system of claim 6 wherein the clock means produces periodic timing signals.

8. The system for preconditioning flue gas of claim 1 wherein the source of a conditioning agent is a source of liquid $SO_2$ and the means for controllably adding the conditioning agent to the flue gas includes a controller pump connected to the source of liquid $SO_2$, a catalytic for converting the $SO_2$ to $SO_3$, the catalytic bed being connected to the controllable pump, and $SO_3$ injectors connected between the catalytic bed and the flue.

9. The system for preconditioning flue gas of claim 1 wherein the source of a conditioning agent is a source of liquid $SO_3$ and the means for controllably adding the conditioning agent to the flue gas includes a liquid metering device connected to the source of liquid $SO_3$ and a vaporizer connected between the liquid metering device and the flue.

10. The system for preconditioning flue gas of claim 1 wherein the source of a conditioning agent is $SO_2$ produced by burning sulfur in air or in excess oxygen.

11. An air pollution control system providing for the removal of fly ash from flue gas by electrostatic precipitation, comprising:
   an electrostatic precipitator positioned to receive a flow of the flue gas;
   a source of a conditioning agent to be added to the flue gas;
   adjustable means for injecting the conditioning agent into the flue gas before the flue gas enters the electrostatic precipitator;
   means for detecting an input power level to the electrostatic precipitator; and
   control means for monitoring the input power level to the electrostatic precipitator and adjusting the amount of conditioning agent injected into to the flue gas to maintain the input power level substantially at a predetermined level.

12. The air pollution control system of claim 11 wherein the electrostatic precipitator comprises a plurality of sections, each section receiving its power from a separate power supply, the input power level to the electrostatic precipitator being the total of the the input power levels to each of the plurality of power supplies.

13. The air pollution control system of claim 12 wherein the power supplied to each of the separate power supplies is measured by the current used by each separate power supply, and the input power level to the electrostatic precipitator is measured by summing the input currents used by at least one of the separate power supplies.

14. The air pollution control system of claim 13 wherein only the separate input currents that each exceed a separate threshold are summed to calculate the input power level.

15. The air pollution control system of claim 14 wherein the conditioning agent is $SO_3$.

16. The air pollution control system of claim 11 wherein the source of a conditioning agent is a source of liquid $SO_2$ and the means for controllably adding the conditioning agent to the flue gas includes a controller pump connected to the source of liquid $SO_2$, a catalytic bed for converting the $SO_2$ to $SO_3$, the catalytic bed being connected to the controllable pump, and $SO_3$ injectors connected between the catalytic bed and the flue.

17. The air pollution control system of claim 11 wherein the source of a conditioning agent is a source of liquid $SO_3$ and the means for controllably adding the conditioning agent to the flue gas includes a liquid metering device connected to the source of liquid $SO_3$ and a vaporizer connected between the liquid metering device and the flue.

18. The air pollution control system of claim 11 wherein the source of a conditioning agent is $SO_2$ produced by burning sulfur in air or in excess oxygen.

* * * * *

UNITED STATES PATENT AND TRADEMARK OFFICE
CERTIFICATE OF CORRECTION

PATENT NO. : 4,779,207

DATED : October 18, 1988

INVENTOR(S) : David L. Woracek; Robert A. Wright

It is certified that error appears in the above-identified patent and that said Letters Patent is hereby corrected as shown below:

Claim 8, line 39, following the word "catalytic" insert --bed--.

Signed and Sealed this

Eighteenth Day of April, 1989

Attest:

DONALD J. QUIGG

*Attesting Officer*  *Commissioner of Patents and Trademarks*

REEXAMINATION CERTIFICATE (2035th)
United States Patent [19]
Woracek et al.

[11] B1 4,779,207
[45] Certificate Issued  Jun. 8, 1993

[54] SO₃ FLUE GAS CONDITIONING SYSTEM

[75] Inventors: David L. Woracek, Federal Way, Wash.; Robert A. Wright, Poway, Calif.

[73] Assignee: Chemithon Corporation, Seattle, Wash.

Reexamination Request:
No. 90/002,549, Jan. 2, 1992

Reexamination Certificate for:
Patent No.: 4,779,207
Issued: Oct. 18, 1988
Appl. No.: 582
Filed: Jan. 6, 1987

Certificate of Correction issued Apr. 18, 1989.

[51] Int. Cl.⁵ .................... G06F 15/46; B03C 3/66
[52] U.S. Cl. ............................. 364/500; 55/5; 55/105; 364/550
[58] Field of Search ............ 55/5, 105; 364/496, 364/500, 550

[56] References Cited
U.S. PATENT DOCUMENTS

| | | | |
|---|---|---|---|
| 2,864,456 | 12/1958 | Hall et al. | 55/106 X |
| 3,686,825 | 8/1972 | Busby | 55/134 X |
| 4,042,348 | 8/1977 | Bennett et al. | 55/5 |
| 4,284,417 | 8/1981 | Reese et al. | 55/2 |
| 4,390,831 | 6/1983 | Byrd et al. | 55/105 X |
| 4,533,364 | 8/1985 | Altman et al. | 55/5 |
| 4,613,346 | 9/1986 | Reyes et al. | 55/105 X |
| 4,624,685 | 11/1986 | Lueckenotte et al. | 55/105 X |
| 4,659,342 | 4/1987 | Lind | 55/105 X |
| 4,770,674 | 9/1988 | Tellini et al. | 55/5 |

*Primary Examiner*—Kevin J. Teska

[57] ABSTRACT

An air pollution control system for injecting a conditioning agent into the flue gas of a power generator. The conditioning agent changes the resistivity of particulate matter in the flue gas, rendering the particulate matter more easily able to accept an electrostatic charge. Control of the conditioning gas injection rate is monitored by periodically sampling the average input power supplied to the power supplies of the electrostatic flue gas conditioning system. A proportion-integral controller receives the signal representing the difference between the average input power and a predetermined threshold signal. The control signal produced by the proportional integral controller causes incremental changes in the rate at which the conditioning agent, such as $SO_3$, is added to the flue gas.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 through 18 is confirmed.

New claims 19 and 20 are added and determined to be patentable.

19. The system for preconditioning flue gas of claim 1 wherein said control means comprises:

means for producing a difference signal proportional to the difference between the monitored input power level and the predetermined power level;

means for comparing the difference signal to predetermined upper and lower levels for said difference signal and for producing a control signal (a) to increase the amount of conditioning agent added to the flue gas when the difference signal lies below the value of the predetermined lower level for the difference signal, and (b) to decrease the amount of conditioning agent added to the flue gas when the difference signal exceeds the predetermined upper level for the difference signal, thereby substantially maintaining the input power at the predetermined power level.

20. The air pollution control system of claim 11 wherein said control means comprises:

means for producing a difference signal proportional to the difference between the monitored input power level and the predetermined power level;

means for comparing the difference signal to predetermined upper and lower levels for said difference signal and for producing a control signal (a) to increase the amount of conditioning agent injected into the flue gas when the difference signal lies below the value of the predetermined lower level for the difference signal, and (b) to decrease the amount of conditioning agent injected into the flue gas when the difference signal exceeds the predetermined upper level for the difference signal, thereby maintaining the input power substantially at the predetermined power level.

* * * * *